United States Patent [19]

Applegate et al.

[11] Patent Number: 4,675,109

[45] Date of Patent: Jun. 23, 1987

[54] REVERSE OSMOSIS PERMEATOR

[75] Inventors: Lynn E. Applegate; Clifton T. Sackinger, both of Wilmington, Del.

[73] Assignee: E. I. Du Pont de Nemours and Company, Wilmington, Del.

[21] Appl. No.: 731,729

[22] Filed: May 8, 1985

[51] Int. Cl.[4] .......................................... B01D 13/01
[52] U.S. Cl. .............................. 210/321.1; 210/352; 210/433.2
[58] Field of Search ............... 210/321.1, 321.2, 321.3, 210/321.4, 321.5, 352, 433.2, 323.2

[56]  References Cited

U.S. PATENT DOCUMENTS

| | | | |
|---|---|---|---|
| 3,228,877 | 1/1966 | Mahon | 210/321.3 |
| 3,526,001 | 8/1970 | Smith | 210/23 |
| 3,583,907 | 6/1971 | Borsanyi | 210/321.4 |
| 3,702,658 | 11/1972 | McNamara et al. | 210/321 |
| 4,265,763 | 5/1981 | Bollinger et al. | 210/323.2 |
| 4,315,819 | 2/1982 | King et al. | 210/352 |
| 4,452,696 | 6/1984 | Lopez | 210/433.2 |
| 4,517,720 | 5/1985 | Otstot et al. | 210/323.2 |

*Primary Examiner*—Benoit Castel

[57] ABSTRACT

A reverse osmosis permeator of the capillary type wherein the tube sheet in which the ends of the capillaries are mounted and the porous support block therefor are slidably mounted on a hollow feed tube mounted in the center of the permeator is disclosed. The invention involves insuring that relative movement between the tube sheet and the support block does not occur during shut down of the permeator. This can be done by hydraulic pressure, spring loading, or mechanical attachment such as one or more bolts.

5 Claims, 3 Drawing Figures

REVERSE OSMOSIS PERMEATOR

BACKGROUND OF THE INVENTION

1. FIELD OF THE INVENTION

The present invention relates to a mounting construction modification for a hollow fiber permselective device, which results in greater product flow and lower salt passage over the life of the permeator.

2. PRIOR ART

J. F. McNamara et al., U.S. Pat. No. 3,702,658, discloses permeation separation devices of the type using permeable capillaries, the open ends of which are embedded in a cast tube sheet which in turn is supported against a support block. The design involves the use of expensive castings and is not used commercially.

More recent reverse osmosis devices which use capillaries or tubes as the separation medium use a straight sided tubular housing (a pipe) with internal annular grooves near the ends of the housing adapted to hold the internal members of the device in place. In this type of construction, the tube sheet and support block are slidably mounted on a central shaft which normally is hollow and serves as the feedwater distribution means.

SUMMARY OF THE INVENTION

The present invention relates to reverse osmosis permeators which use hollow tubes as permeators. The hollow tubes are mounted in a straight pipe type housing with sealed ends. The ends of the hollow tubes are mounted in a tube sheet formed of a potting resin such as epoxy. The pressure from the tube sheet is borne by a porous support block. The invention involves the discovery that much greater permeator life can be obtained if the tube sheet and support block are held in intimate contact during the entire life of the permeator and not allowed to move with respect to each other when the permeator is not in use.

DETAILED DESCRIPTION OF THE DRAWINGS

Figure 1:
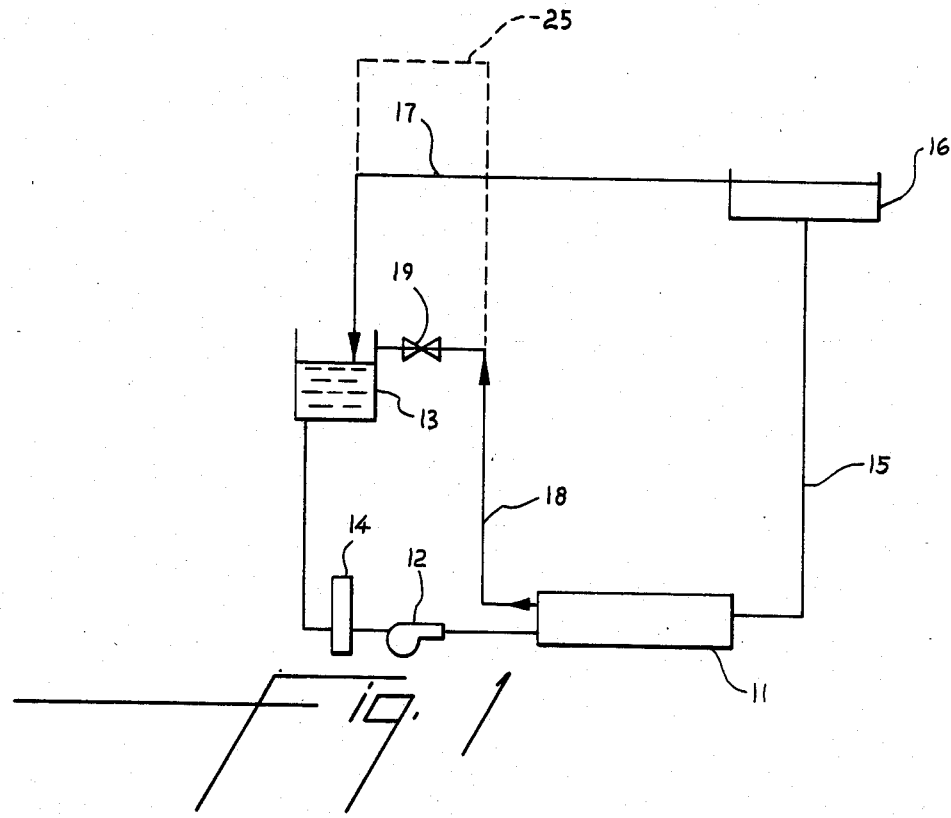
FIG. 1 is a schematic diagram of a permeator test apparatus.

Referring now to FIG. 1, salt water is fed to permeator 11 by means of pump 12 from supply tank 13 through filter 14. Desalinated water is removed from permeator 11 and fed through line 15 to product and drawback tank 16. Water overflowing product and drawback tank 16 is returned through line 17 to supply tank 13. Water rejected by permeator 11 is fed through line 18 and valve 19 to supply tank 13. Broken line 25 depicts the return line used in one embodiment of the present invention as detailed in Example III below.

Figure 2:
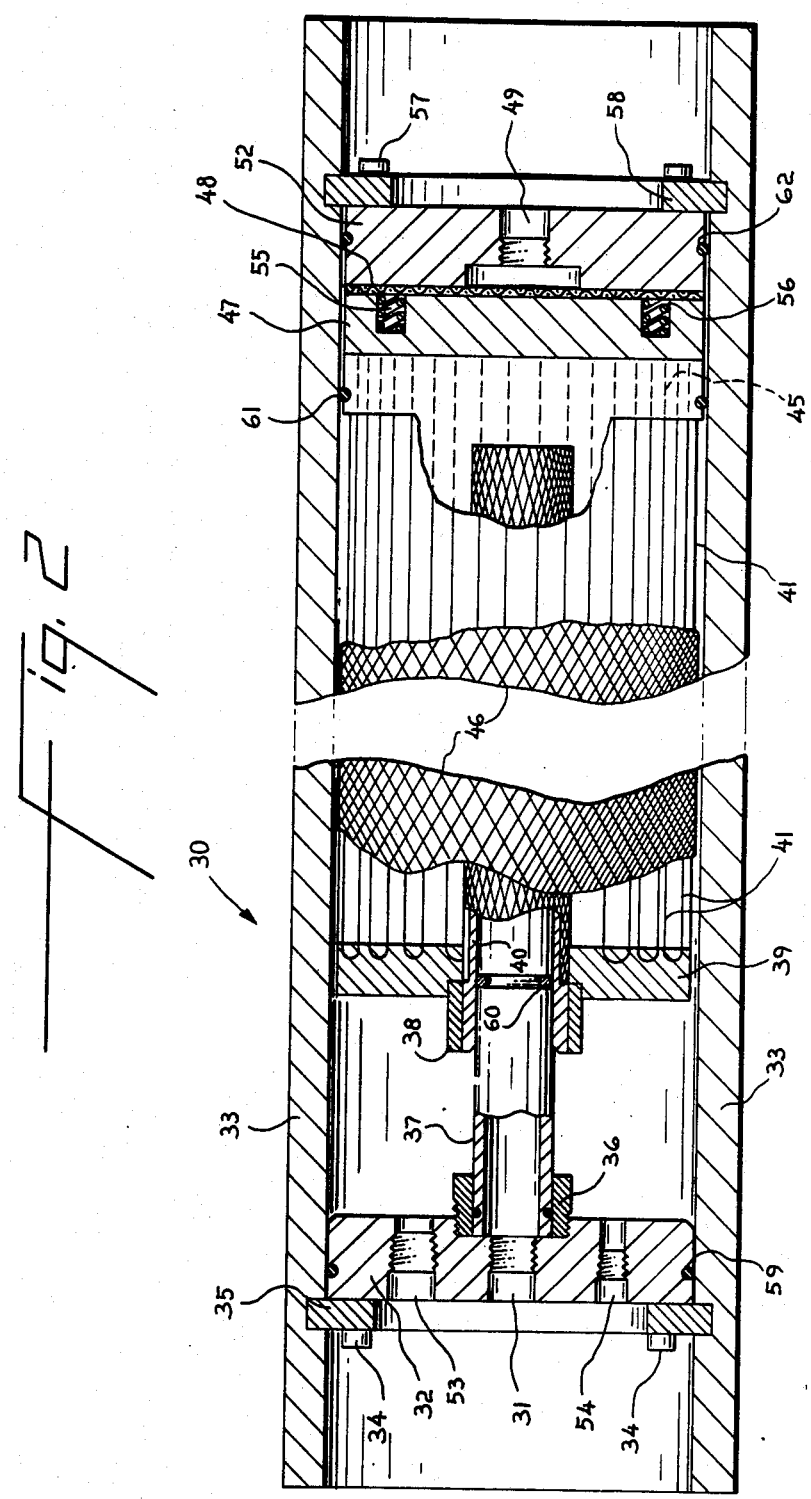
FIG. 2 is a sectional view of a permeator of the present invention.

Referring now to FIG. 2, the permeator is indicated generally as 30. Salt water is fed into port 31 in end plate 32 which is held in place in shell 33 by means of bolts 34 segmented ring 35. End plate sleeve 36 is threadably mounted in end and plate 32 receives feed tube 37. Permeator sleeve 38 serves to mount deflector block 39 and distributor 40 on feed tube 37. Deflector block 39 serves to hold permeator tubes or capillaries 41 in place. Feed water in feed tube 37 is fed from feed tube 37 through distributor 40 into the zone in the permeator containing capillaries 41. Feed tube is foraminous between deflector block 39 and tube sheet 45 into which the open ends of capillaries 41 are mounted. The outside of the bundle of capillaries 41 is covered with flow screen 48. Water flows into capillaries 41, through tube sheet 45, porous support block 47, screen 48 and port 49 in end plate 52. Rejected brine is removed from the permeator through port 53 in end plate 32. Sample port 54 is also located in end plate 32. Springs 55 and 56 are part of a set of four springs, which are mounted in support block 47, serve to urge support block 47 against tube sheet 45. The pressure of springs 55 and 56 is taken up by end plate 52 at the outlet end of permeator 30 and by feed tube 37 bearing on end plate 32 at the inlet, brine outlet end of permeator 30. End plate 52 is held in place by bolts 57 in segmented ring 58. O-rings 59, 60, 61 and 62 serve to prevent leaks in permeator 30.

Figure 3:
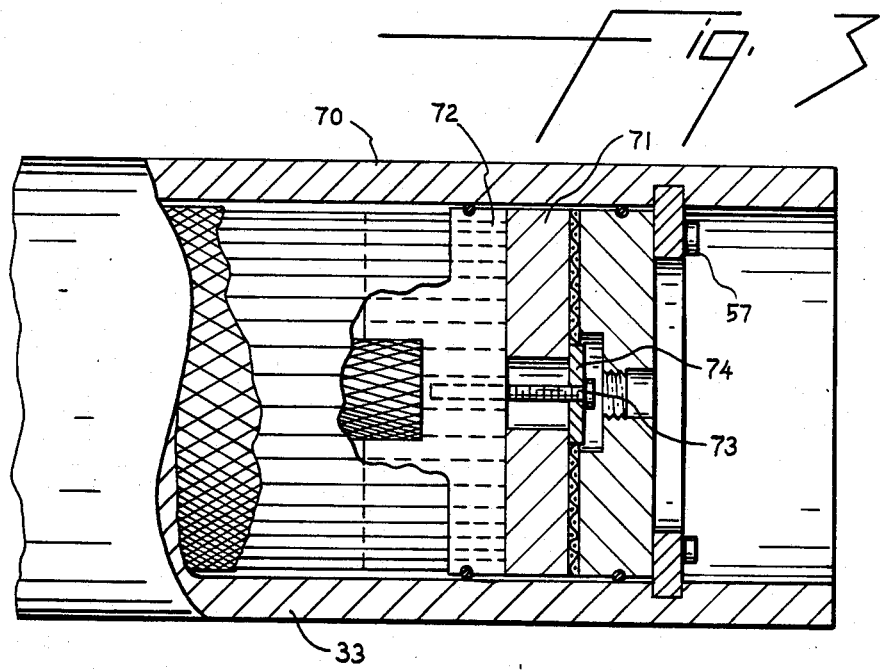
FIG. 3 is a sectional view of one end of a permeator of the present invention having an alternate construction.

Referring now to FIG. 3, a permeator 70 is depicted in which support block 71 is held in permanent contact with tube sheet 72 by means of bolt 73 and washer 74, instead of the springs used in the permeator depicted in FIG. 2. The remainder of permeator 70 is similar to permeator 30 depicted in FIG. 2.

DETAILED DISCLOSURE

Conventional permeators similar to that depicted in FIG. 2, but without springs 55 and 56, have been sold commercially for a number of years. They have been set up with the feed and product water plumbing on a level therewith or below the level of the permeator, or with a check valve in the product line to prevent reverse flow. When the permeator is shut down and seawater, or brackish water which is high in dissolved salt, is being desalinated the osmotic pressure can be as much as 400 psi. ($2.7 \times 10^6$ Pa). The capillaries are supplied with water during shut downs to prevent them from becoming osmotically dehydrated which has an adverse effect on their performance in desalinating water. In accordance with one aspect of the present invention, an elevated drawback tank on the product side of the permeator is used to supply this water which results in the product water pressure being greater than the feed brine pressure during shutdown. When built new feed tube 37 is normally cut to length fairly accurately, but it has now been discovered that after being in use there is deformation of tube sheet 45 and support block 47 so that during a shut down there is movement of the tube sheet away from the support block. It has now been found that when the tube sheet and support block reengage upon start up there is relative rotational movement which causes damage to the ends of the capillaries and results in a decrease in both throughput of desalinated water and salt rejection. The decrease in salt rejection is believed to be due to an increase in pressure within the end damaged capillaries which results in decreased flow of desalinated water while about the same amount of salt is transmitted through the capillaries since this is less of a pressure dependent function.

The spring loaded technique of maintaining the tube sheet and support block in constant intimate contact as shown in FIG. 2 is the preferred technique. Alternatively, during shutdown the use of hydraulic pressure from the feed end of the permeator can be used such as with an apparatus similar to that shown in FIG. 1 but modified so that there is a brine water line elevated above the supply of draw back water during shut down. A third less preferred technique is to mechanically attach the tube sheet and support block together such as by taping or bolting.

The test stand used for the experiments is shown in FIG. 1. To simulate actual Du Pont Model 6840T-B-10 reverse osmosis plants, the product water drawback tank was elevated 7.3 meters above the permeator to create a product pressure at shutdown of 10-11 psig.

The cycling tests were performed and the support feed tubes in the permeators were shortened to allow bundle movement of 13 to 16 mm. Thus, at shutdown the feed-reject pressure was reduced and the product pressure of 10-11 psig moved the bundle back toward the feed end of the permeator. On start-up the feed pressure would move the bundle against the product endplate.

The typical experimental procedure was as follows:

1. Remove fiber bundle from shell, rate the quality of the tube sheet cut and shorten the feed tube to allow bundle movement of 13-16 mm.
2. Reinstall the fiber bundle in the shell and attach special product end plate to permit measurement of bundle and support block movements (FIG. 2).
3. Operate permeator at 1000 psig, 25° C. and 30% conversion using a 30,000 mg/l NaCl feed solution using the test stand shown in FIG. 1.
4. After the initial 16-20 hours of continuous operation, measure the reverse osmosis parameters.
5. Shutdown the system, and after 2-3 min. measure the movement of the bundle and support block.
6. Rapidly start-up the system (0 to 500 psig in 1 sec. and 500 to 1000 psig in 2-3 sec.) and operate for about 30 sec. Then repeat step 5.
7. After every 10 start-up and shutdown cycles operate the permeator for about 30 minutes and then measure reverse osmosis parameters.
8. After a given number of cycles, remove fiber bundle from shell, rate quality of tube sheet cut, recut face of tube sheet, treat the permeator with tannic acid as described in Chen and Ganci, U.S. Pat. No. 3,886,066, and measure the reverse osmosis parameters using test stand shown in FIG. 1.

EXAMPLE I

A Du Pont model 6840T B-10 permeator was modified as described below in order to incorporate compression coil springs. These springs are positioned so that they always force the support block into intimate contact with the epoxy tube sheet face.

MODIFICATIONS

1. Four ½-inch diameter holes ¾-inch deep were drilled into one side of the support block at equal spaces around the axis of the block at a radius of 3 inches.
2. Four compression coil springs were placed in the holes drilled into the support block. The springs were made from type 302 stainless steel wire with a diameter of 0.063 inches. The free length of the springs was 1¼ inches and the springs have a spring rate of about 37.5 pounds force per inch of compression.
3. A 1½-inch wide by 0.004-inch thick ribbon of polyester plastic was placed around the outside diameter of the support block so that the support block would slide easily on the inside surface of the permeator shell.
4. The support block with the four springs and the polyester strip were installed in the permeator so that the springs were visable when looking at the product end of the permeator with the end plate not installed.
5. The support screen and the end plate were installed so that each of the four springs were compressed approximately ⅛ inch, this caused each spring to push on the support block with a force of about 4.6 pounds and hold the support block securely against the face of the epoxy tube sheet.

On-off cycle testing was performed using this permeator with the unmodified test stand shown in FIG. 1 and test procedure previously described. During on-off cycle the bundle movement varied between 3.1 and 9.5 mm, but as determined by special measuring devices separation of the support block and tube sheet face did not occur. After 500 on-off cycles, within experimental error, the product flow did not change. The salt passage increased by 40% from an initial salt passage of 0.5%. After 500 on-off cycles, the tube sheet face had a sheen appearance which indicates that separation and relative rotation of the support block and tube sheet face did not occur.

After 500 on-off cycles, the special support block and springs were removed and a normal support block was installed. The permeator was then on-off cycle tested. After 220 on-off cycles, the product flow decreased 27.6% and the salt passage increased by 113%. During the 220 on-off cycles, the bundle movement varied between 1.6 and 9.5 mm and the separation between the support block and tube sheet face averaged 1.5 mm during shut down. After the 220 on-off cycles, the tube sheet face had a very heavy haze appearance which is clear evidence of separation and relative rotation of the support block and the tube sheet face. The tube sheet was recut and the permeator was treated with tannic acid as described in U.S. Pat. No. 3,886,066. The product flow increased to within 2% of the original product flow and the salt passage was 1% compared with an original salt passage of 0.5%.

The data presented above clearly show that the spring modification prevents separation and relative rotation of the support block and tube sheet face. Thus, stable reverse osmosis performance was obtained even after 500 on-off cycles. This corresponds to a plant shut down and start-up of slightly more than twice per week over 5 years of operation.

EXAMPLE II

A new B-10 permeator was selected and the support block was bolted to the face of the tube sheet using a single bolt through the support block and part way into the tube sheet where a hole was bored and threads tapped to receive the bolt (see FIG. 3). On-off cycle testing was then performed. After 260 cycles, within experimental error, no change in the product flow or salt passage was observed. During the cycling, bundle movement varied between 3.2 and 4.0 mm. After 260 cycles, the support block was unbolted and the cycling was resumed using the same support block. After only an additional 102 cycles, the product flow had decreased by 11.1% while the salt pasage increased by 16.7% (relative). The support block was then rotated approximately 10° manually after each cycle. After only 10 cycles (10 rotations), the product flow decreased an additional 10.9% but the salt passage did not change.

EXAMPLE III

The reject line was extended to a higher level (about 1.5 meters) than the water level in the drawback tank (see dashed line 25 in FIG. 1). With this process modification, when the permeator is shutdown, the fiber bundle will not move because the feed-brine pressure (12-13 psi or 83-90 kPa) is greater than the product pressure (10 psig or 69 kPa). The ΔP of 2-3 psi (14-21 kPa) is caused by the greater static head in the reject line. With the process modification, the product drawback still occurs but the fiber bundle and support block do not move.

Using the process modification, a new B-10 permeator was cycle tested. During on-off cycling, accidental bundle and support block movements occurred during only 3 cycles. After 260 cycles the product flow decreased by only 3.2% and the salt passage increased by only 10.5% (relative).

The permeator was then cycled for 150 times using the procedure which allowed bundle movement. The bundle movement was 15.9 mm and the separation between the support block and tube sheet face during shutdown was 6.4 mm. After only 150 on-off cycles, the product decreased by 9.9% and the salt passage increased by 9.1% (relative). The support block was then rotated 10° manually after each cycle for a total of 10 cycles. This caused a decrease of 5.8% in the product flow and an increase of 4.2% (relative) in the salt passage. Overall, with only 160 cycles (150 movement+10 rotation) the product flow decreased by 15.1% while the salt passage increased by 13.6% (relative).

The permeator was then cycled 150 times using the modified process with no bundle movement. This decreased the product flow by only 2.9% and increased the salt passage by only 4.2% (relative). If the results with no bundle movement are summarized, after 410 on-off cycles (one shutdown and start-up every 4.5 days over 5 years of operation) the product flow decreased by 6.1% (versus a projected product flow loss of 4.0% caused by normal membrane compaction) and the salt passage increased by 14.7% (relative).

We claim:

1. A tubular reverse osmosis permeator containing a plurality of capillaries the open ends of which capillaries are mounted in a tube sheet which is mounted on shaft adapted to bear against the end of said permeator away from said tube sheet when said permeator is not in operation, a porous support block slidably mounted within said permeator adapted to bear against the end of said tube sheet and thereby support it against pressure when said permeator is in operation; and means adapted to ensure constant urging of said support block against said tube sheet when said permeator is shut down.

2. The tubular reverse osmosis permeator of claim 1 wherein the means adapted to ensure constant urging of the support block against the tube sheet are springs bringing pressure between the support block and the end of the permeator.

3. The tubular reverse osmosis permeator of claim 1 wherein the means adapted to ensure constant urging of the support block against the tube sheet is a body of water on the feed brine end of the permeator located higher than any body of water connected to the product end of the permeator during shut down of the permeator.

4. The tubular reverse osmosis permeator of claim 1 wherein the means adapted to ensure constant urging of the support block against the tube sheet is direct mechanical attachment between the tube sheet and the support block.

5. The tubular reverse osmosis permeator of claim 4 wherein the means adapted to ensure constant urging of the support against the tube sheet is a bolt.

* * * * *